Aug. 12, 1941.   V. F. CARUS   2,252,362

CRACKER MACHINE

Filed March 27, 1939   3 Sheets-Sheet 1

INVENTOR
VAUGHN F. CARUS
BY
ATTORNEY

Aug. 12, 1941.   V. F. CARUS   2,252,362
CRACKER MACHINE
Filed March 27, 1939   3 Sheets-Sheet 3

INVENTOR
VAUGHN F. CARUS
BY
ATTORNEY

Patented Aug. 12, 1941

2,252,362

UNITED STATES PATENT OFFICE 2,252,362

CRACKER MACHINE

Vaughn F. Carus, Saginaw, Mich., assignor to Baker Perkins Company, Inc., Saginaw, Mich., a corporation of New York Application March 27, 1939, Serial No. 264,417

4 Claims. (Cl. 146—129)

This invention relates to the manufacture of thin crisp biscuits, crackers and the like. More specifically, it pertains to improved means for automatically breaking large transversely scored sheets of freshly baked crackers into strips, each comprising one or more rows of crackers.

In commercial baking, the strips thus produced are afterwards snapped by hand into shorter units to fit the carton in which they are to be packed, or else the subsequent breaking into units of carton size may be done by machinery instead of by hand. Improved machinery for this purpose is described and claimed in my copending application Serial No. 264,418 filed March 27, 1939.

The invention presented here comprises novel and simplified means for progressively and automatically snapping off one or more transverse rows at a time from the advancing end of a continuous sheet of crackers, or from separate panels of crackers while being conveyed away from an oven on a band, belt or mesh.

Correct appreciation of the novelty and advantage in use of my invention requires a brief exposition of well-known occurrences which attend the handling of such material.

The baked sheets usually occupy the whole width of the conveyor, say, about 32-inches for an ordinary sized oven, there being sixteen 2-inch crackers to each transverse row.

In the direction of its travel the sheet may be continuous; in which circumstance the breaking off device may be required to snap off from the advancing end of the sheet rows sixteen crackers long, and one, two, or more crackers wide.

Or, instead of being a continuous sheet the material may be series of panel-like sections spaced apart from each other along the belt, the spaces between panels depending upon the amount of lengthwise shrinkage that develops in the dough sheet in the oven. Such a panel section usually consists of four rows of crackers. The break-off device may be required to snap each four-row panel section into two strips of two rows each. The above particulars are recited merely to indicate the nature of the problem.

An object of my improvement is to provide a simplified inexpensive mechanism whereby either transversely scored sheets of baked crackers or separated panels, while being transported on a conveyor, can be snapped off automatically along predetermined frangible scores, attaining such transverse severing in a better and more effective manner than was done with earlier devices.

An object is to provide a breaking device that is not dependent for its effectiveness upon its exact placement and timing; operating equally well either on separate panel sections or continuous sheets.

Earlier devices made it necessary to apply momentary breaking force in accurately timed relation to the movement of the sheet of crackers on the belt and, moreover, to apply it exactly upon the predetermined scores. Such devices required to be associated with mechanical timing and positioning controls that frequently got out of adjustment, especially if working on panel sections that were spaced apart irregularly on the conveyor. They also caused destruction of goods by producing breaks remote from the score line.

The accompanying drawings show preferred arrangements embodying my invention as they appear when associated with the belt from a cracker oven. Modifications are also shown, within the scope of the appended claims.

In the drawings, Fig. 1 is a partly diagrammatic view in perspective showing a delivery belt carrying panels of crackers from a continuous bake oven with my improved breaking or seam snapping device associated with the belt;

Figure 6:
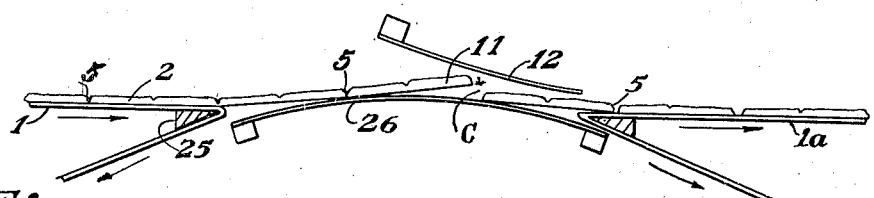
Figure 7:
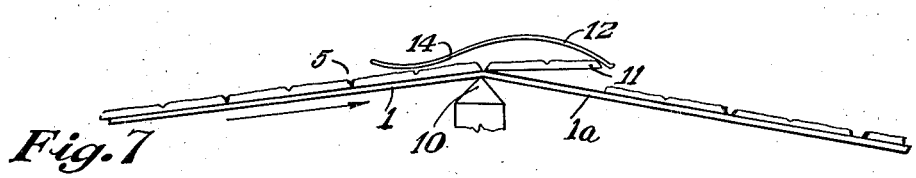
Figure 8:
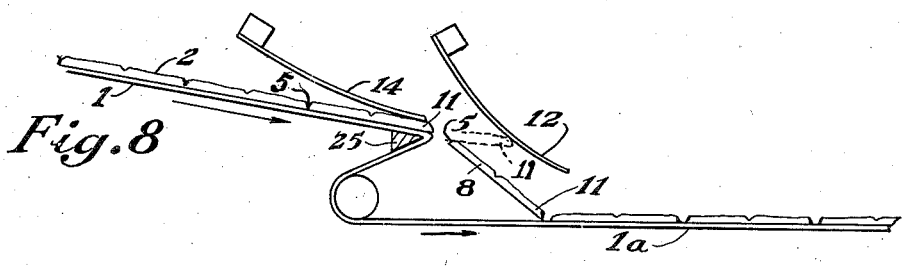
Figure 9:
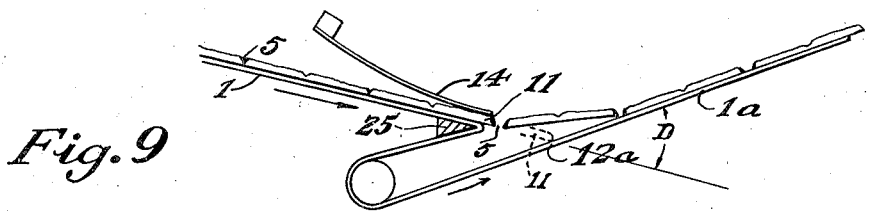

Figs. 6, 7, and 8 are diagrammatic views showing typical modified forms of the device;

Fig. 9 is a diagrammatic view showing a further form embodying in general the same principle and mode of operation as the previously illustrated forms but differing in certain structural features and arrangements.

Figure 1:
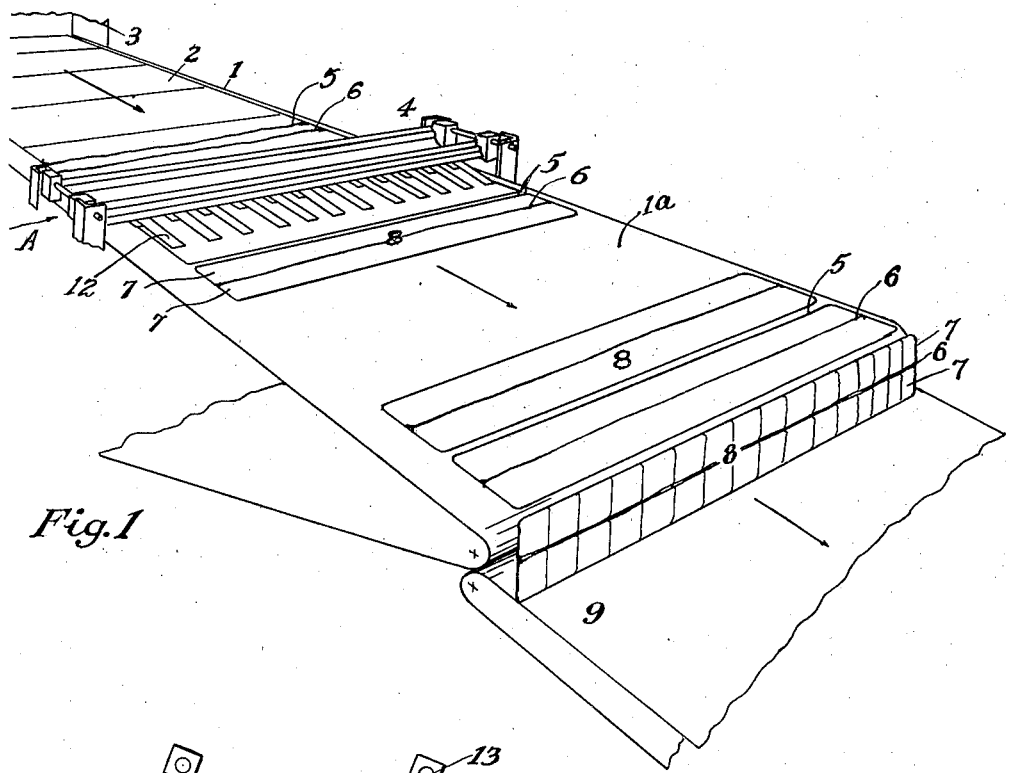

Referring now to Fig. 1, numeral 1 designates a delivery belt carrying sheets of crackers 2 away from a continuous bake oven 3. Numeral 4 designates in general my improved breaking device which acts upon the sheet of crackers 2 while traveling on the belt.

Its function is to break or snap the sheet 2 along weakened scores 5 that extend transversely to the direction of the travel of the belt. It may be noted here that intermediate scores 6 which are stronger and less easily frangible are provided between scores 5, but for the purpose of this description the stronger scores 6 will be assumed to remain unbroken so the strip as delivered from the device is two rows wide, as shown at 7, 7, and 8.

Some of the intermediate strips of crackers on the belt are omitted from Fig. 1 for the sake of clearness. The initial belt run 1 is approaching the breaking devices 4 in the direction of the arrows, and the final belt run 1a has passed through the device 4, and is carrying away the finished strips 8. The severed strips 8 proceed to the end of the belt run 1a and are discharged therefrom in vertical or tilted positions one after the other, onto a take-off belt 9 that removes them in echelon or face-to-face arrangement.

Figure 2:
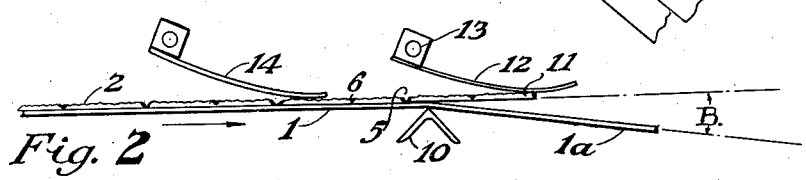
Fig. 2 is a diagrammatic side view of the principal elements of the breaking device, showing their position when about to break off the advancing end portion of a sheet of crackers crosswise of the belt, to yield a transverse strip consisting in this instance of two rows of crackers.
Figure 3:
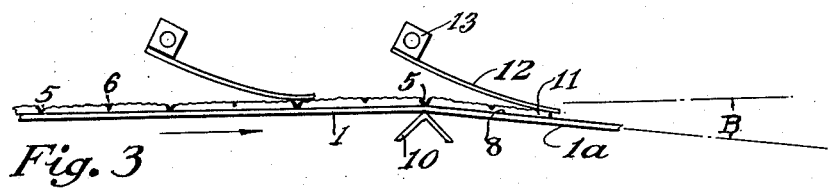
Fig. 3 is a similar view, showing the position of the members after such transverse strip has been snapped off.

The principal elements of the breaking device 4 are shown diagrammatically in Figs. 2 and 3, where numeral 10 designates a bar or nosing member mounted beneath the conveyor parallel with the transverse frangible scores 5 and extending from one side of the conveyor to the other. Member 10 supports the under side of belt 1 and diverts the belt run 1a away from its initial plane of travel 1, that is, downwardly as indicated at B in Figs. 2, 3, and 4. Other arrangements are shown in the subsequent views.

As the belt run 1 passes over member 10 the unsupported forwardly projecting and advancing edge portion 11 of the sheet of crackers encounters a guide member 12 which diverts 11 away from its initial direction of travel, thereby creating a bending strain along the frangible score 5 and snapping the sheet off, thus producing the double-row strips, 8.

It is not necessary that member 10 should be directly underneath or in register with score 5 at the moment of fracture. It may be either substantially adjacent or somewhat remote from the score and still develop a clean break.

I have found it helpful in some installations to provide a hold-down device 14 for the crackers of sheet 2 just before their arrival at the member 10, to overcome the tendency for that part of the sheet to lift up from the belt when the advancing edge 11 encounters the guide 12.

In Fig. 3 the severed row 8 is shown starting on its way along the run 1a, being about to pass underneath the guide member 12.

Figure 4:
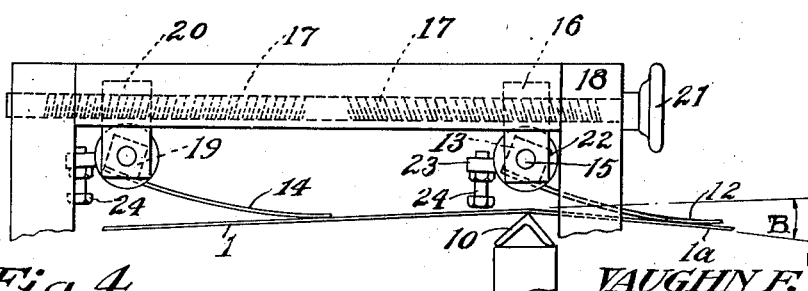
Fig. 4 is an end view of the members shown in Figs. 1, 2, 3, with their supports and devices for their adjustment, viewed in the direction of arrow A, Fig. 1.
Figure 5:
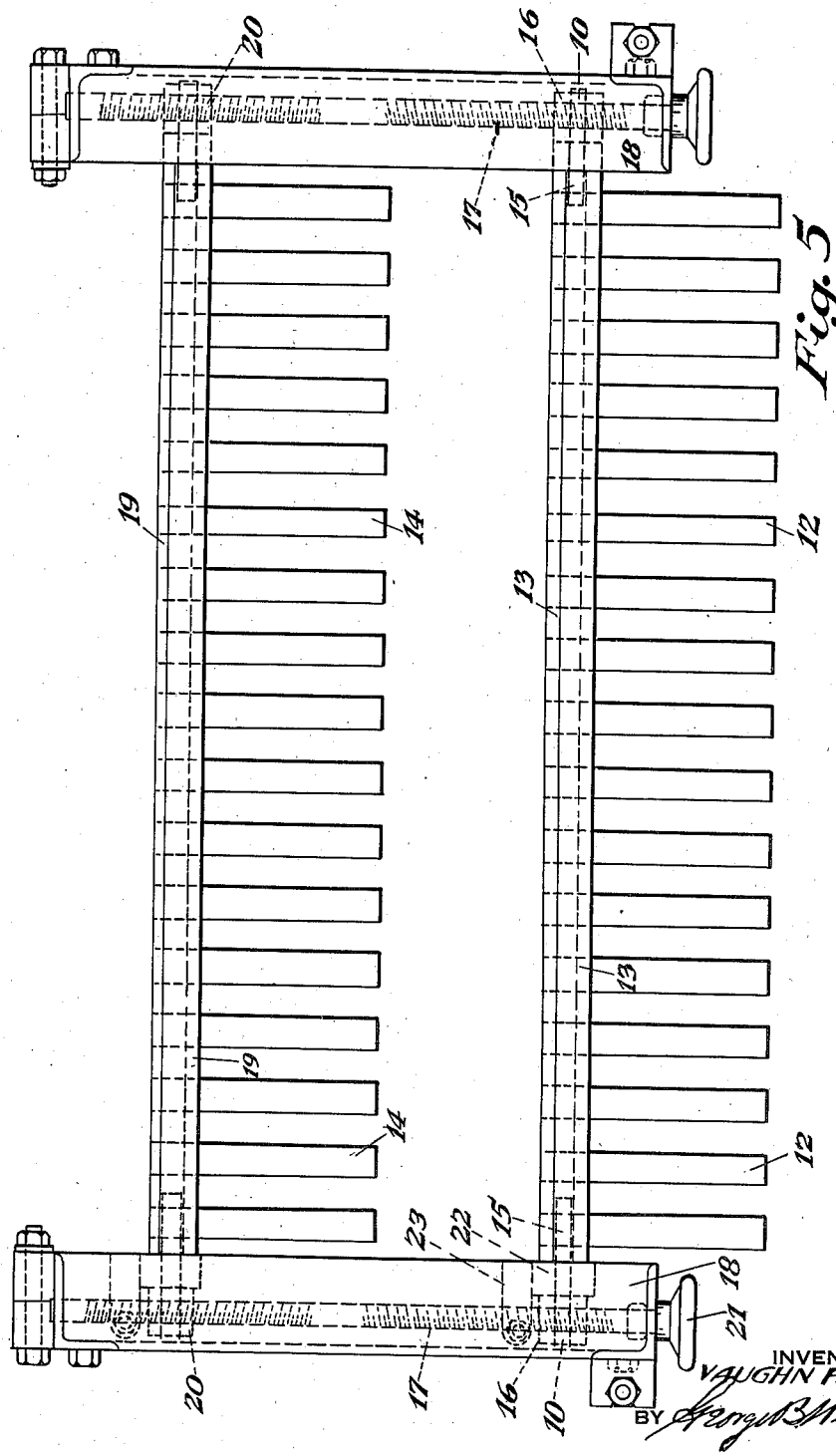
Fig. 5 is a plan view of the parts shown in Fig. 4.

Referring now to Figs. 4 and 5, being respectively an end view and plan view of the breaking device 4, it will be seen that guide members 12 are formed like leaf springs secured to supports 13 that extend transversely above the belt from side to side of the conveyor. The ends of bar 13 are mounted on trunnions 15 which are pivoted in housings 16. The housings 16 are bored and threaded to receive screws 17, mounted on a fixed support 18 and adapted when rotated to move the bars 13 and guide members 12 lengthwise of the conveyor. Similarly the hold-down devices 14 are mounted on a pivoted bar 19 which is carried by housings 20. The housing 20 is threaded in opposite sense from housing 16, so that when the handle 21 of right and left hand screws 17 is rotated in one direction it will draw the members 12, 14 closer together, and rotated in the opposite direction will separate them. Also, guide member 12 will be drawn toward or moved away from the belt deflecting member 10. Thus by turning the handle 21 it is possible to vary the amount of unsupported overhang of the free end 11 of the row of crackers when the crackers have advanced far enough to encounter the guide member 12. Such adjustment enables the operator to set the device so as to snap off the biscuits at any predetermined score line 5 and produce strips that consist of one row of crackers, or two or more rows as may be desired. Similarly, the hold-down device 14 is adjustably established in relation to the belt deflecting member 10.

The guide members 12, in addition to their adjustability in the direction of length of the conveyor can be adjusted up and down to vary the transverse thrust or urge given to the advancing free end of the sheet of crackers.

A collar 22, Fig. 4, is fixed to one of the trunnions 15. The collar carries a rearwardly projecting arm 23 in which is mounted an adjustable set bolt 24. The head of the belt is adapted to engage a fixed abutment, not shown, such as the supporting frame of the conveyor. By adjusting this bolt 24 the position of guide member 12 can be readily adjusted with respect to the path of travel of the end 11 of the sheet of crackers.

My invention may be embodied in various structures other than those shown in Figs. 1 to 5 inclusive. For example, in Fig. 6 a conveyor belt 1 is shown as terminating at a nosing 25 which diverts the conveyor rearwardly and downwardly away from its original plane of travel, but allows the crackers 2 to continue on beyond the nosing and slide over the surface of a stationary guide 26. The free advancing end 11 of the sheet of crackers travels in a straight line that diverges upwardly at C from the bowed guide 26, to encounter the guide member 12. The guide 12 urges the end 11 of the sheet of crackers downwardly away from its initial plane of travel along guide 26. Thereby the sheet is fractured along the predetermined frangible scores 5 as they arrive in regular order at substantially the diverting portion 26 of the bowed guide.

The fracture along the score line is made clean and crumbles by reason of the leverage afforded by the length of the crackers that comprise the advancing edge portion of the sheet.

In Fig. 7 is shown an arrangement similar to that of Figs. 2 and 3, wherein the guide member 12 and the hold-down device 14 are in one piece instead of independent as shown in Figs. 2 to 5.

In Fig. 8 the run 1 passes underneath the hold-down device 14 and around a nosing 25, as in Fig. 6, and the end 11 of the sheet of crackers proceeds unsupported, as indicated by broken lines, until it encounters the guide member 12 and is thereby directed downwardly and broken off near the nosing 25 along the frangible score 5, producing the two-row strip 8 which drops onto a subsequent belt run 1a.

In Fig. 9 the belt run 1 passes under the hold-down 14 and around the nosing 25, thence is guided upwardly in a run 1a that intercepts the plane of travel of run 1. The biscuit edges 11, which are unsupported after leaving the run 1, come into contact at 12a with the run 1a and are urged upwardly away from their initial plane of travel as indicated at D, and are snapped off at the weakened scores 5.

From the foregoing description it is seen that in this machine the advancing unsupported edge portion 11 of the sheet of crackers upon encountering the guide member 12 is urged by the guide away from the initial plane of travel of the sheet, that is, in a downward direction in Figs. 2 and 8 and upwardly in Fig. 9. This bending of the sheet causes a fracture to occur at each weakened score 5 in its regular order. The fulcrum or supporting point about which the cracker is bent to create the fracture is the member 10 in Figs. 2, 4, and 7, and in Figs. 8 and 9 the fulcrum is provided by nosing 25. In Fig. 6 the fulcrum is at the location of numeral 26. It is thus seen that in all of the modifications illustrated there is present the same mode of operation and fundamentally the same combination of devices whereby the crackers are broken off from the end of the advancing sheet by bending the unsupported end of the projecting sheet out of its normal plane of travel and effecting the bending by a supporting member which acts as a fulcrum, but does not require exact placement or timing of the arrival of the scores 5 at the exact fulcrum point. The device, therefore, is capable of operating satisfactorily without any coordinating or timing mechanism such as has heretofore been employed in devices of this kind.

Having thus described my invention, what I claim and desire to secure by Letters Patent is:

1. In a cracker sheet breaking device, a conveyor belt including an initial run passing around a nosing that defines the end of said run; said device having in combination holding-down means adjacent the nosing to engage crackers on said run; and a subsequent belt run traveling across the plane of travel of the sheet of crackers on the initial run and spaced in advance of the nosing, and presenting a structure beyond the nosing for snapping off the crackers by engaging and bending the unsupported end of the advancing sheet.

2. In a machine of the character described having a transporting belt for baked cracker sheets formed with transverse frangible scores, a nosing extending across and supporting the belt from side to side and diverting the belt away from its initial plane of travel, the initial run of the belt being arranged to advance an edge portion of said sheet unsupported beyond the nosing, a member located in the path of travel of said unsupported edge portion and being arranged to be engaged thereby when a frangible score of the sheet of crackers has advanced to a position adjacent said nosing, said member being arranged and adapted to deflect the unsupported portion of the sheet of crackers away from its initial plane of travel and cause the sheet to fracture along the score adjacent the nosing.

3. In a machine of the character described having a transporting belt for baked cracker sheets formed with transverse frangible scores, a nosing extending across and supporting the belt from side to side, the initial run of the belt being arranged to advance an unsupported portion of said sheets beyond the nosing; a member located subsequent to said nosing in the path of travel of said unsupported portion, said member being arranged to engage such unsupported portion and to urge the same away from its original plane of travel and to thereby fracture the sheet along a score adjacent the nosing.

4. In a machine of the character described having a transporting belt for baked cracker sheets formed with transverse frangible scores, a transverse member extending across and supporting the belt from said to side, the initial belt run terminating at said member and being arranged to advance said sheet beyond the member; a hold-down device adapted to engage the advancing crackers just before their arrival at said transverse member; a guide member located in the path of the sheet of crackers subsequent to the transverse member, said guide being arranged to be engaged by the advancing portion when a frangible score of the sheet is fulcrumed on the transverse member, the said guide member being adapted to deflect the advancing edge of the sheet from its plane of travel and thereby effect fracture of the sheet along said score.

VAUGHN F. CARUS.